July 31, 1923.
J. ULLRICH
1,463,734
TREE HOLDER
Filed Oct. 11, 1921
2 Sheets-Sheet 2
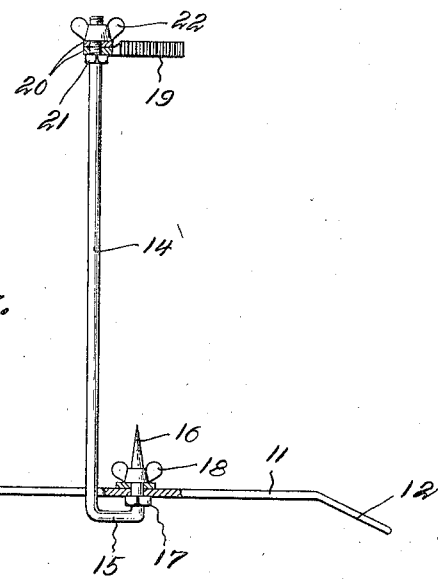
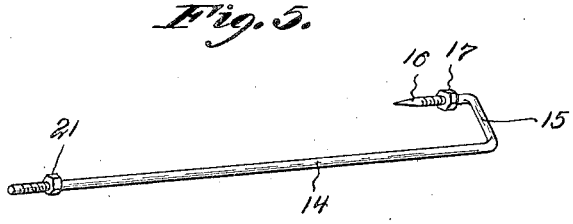
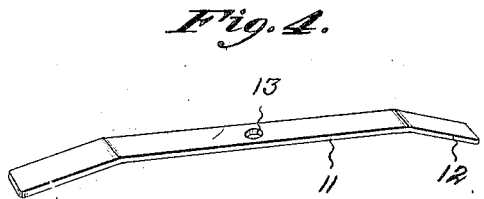
John Ullrich
INVENTOR
BY Victor J. Evans
ATTORNEY
WITNESS:

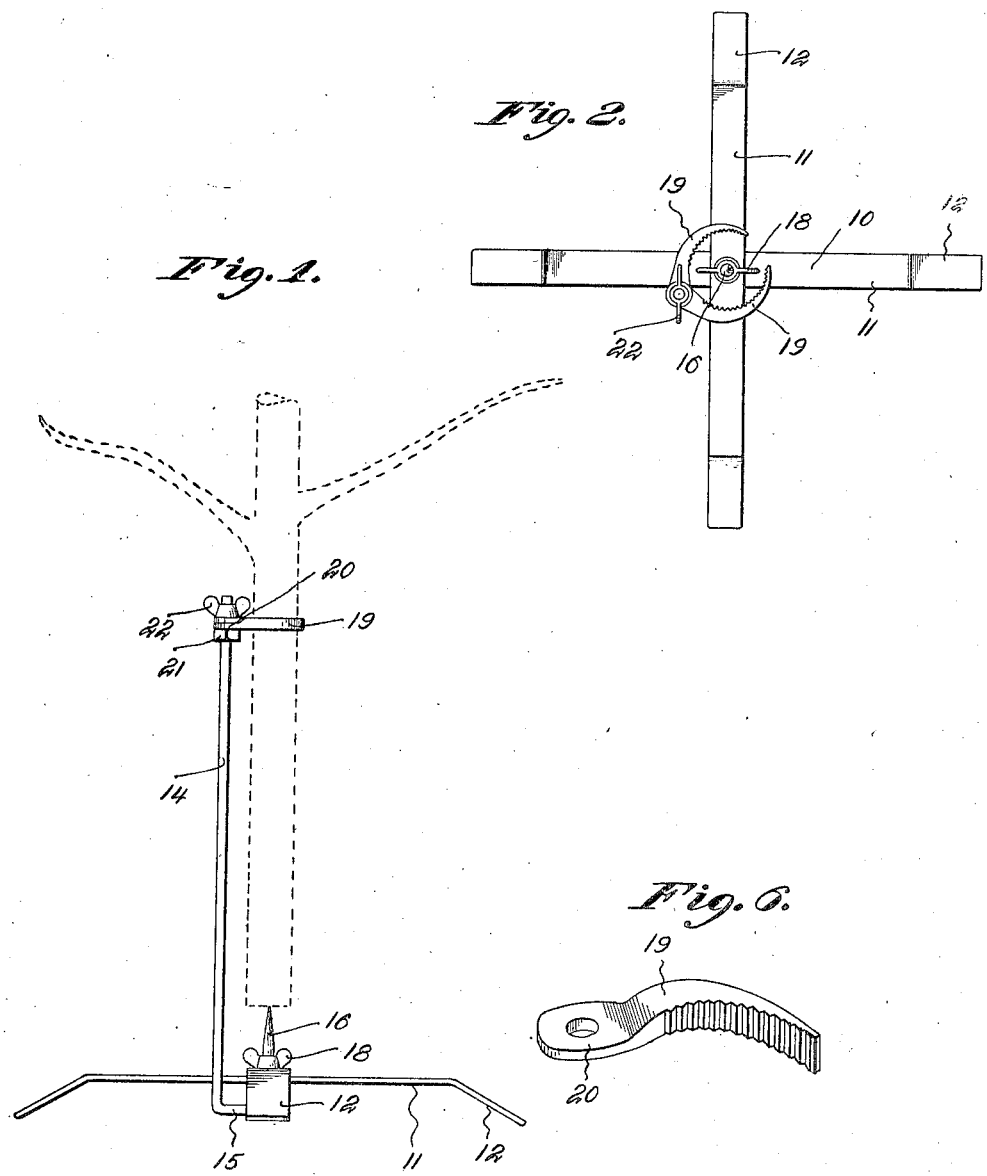

Patented July 31, 1923.

1,463,734

UNITED STATES PATENT OFFICE.

JOHN ULLRICH, OF SALT LAKE CITY, UTAH.

TREE HOLDER.

Application filed October 11, 1921. Serial No. 507,006.

*To all whom it may concern:*

Be it known that I, JOHN ULLRICH, a citizen of the United States, residing at Salt Lake City, in the county of Salt Lake and State of Utah, have invented new and useful Improvements in Tree Holders, of which the following is a specification.

This invention relates to improvements in tree holders and has for an object the provision of a neat, simple and cheap device which is especially designed for supporting a Christmas tree in an upright position.

Another object of the invention is the provision of a tree holder which is formed of separate sections, removably secured together to form a firm, light support, which may be easily taken apart for packing, when not in use.

With the above and other objects in view, the invention further includes the following novel features and details of construction, to be hereinafter more fully described, illustrated in the accompanying drawings and pointed out in the appended claim.

In the drawings:—

Figure 1 is a side elevation of a Christmas tree holder set up in position for use, a portion of a tree being shown by dotted lines.

Figure 2 is a plan view of the holder.

Figure 3 is a vertical sectional view.

Figure 4 is a detail perspective view of one of the base members.

Figure 5 is a similar view of the standard.

Figure 6 is a like view of one of the gripping jaws carried by the standard.

Referring in detail to the drawings, wherein like characters of reference denote corresponding parts, the reference character 10 indicates the base of the holder which is of sectional formation and includes a pair of superimposed members 11. These members are preferably in the form of metallic strips which are bent at each end to provide downwardly extending feet 12 and horizontally disposed intermediate portions having openings 13 therein.

The holder further includes a standard 14 which is preferably in the form of a rod whose lower end is bent at a right angle to provide a horizontally arranged portion 15 and from which extends a sharpened extremity, forming a penetrating point 16 which is disposed substantially parallel to the standard 14. At the base of this penetrating point there is provided a flange, herein shown in the form of a nut 17 whose upper face provides a stop, against which the members 11 of the base rest after the penetrating point 16 has been passed through the registered opening 13. As illustrated in the drawings, the penetrating point 16 will then be arranged centrally of the base with the standards 14 offset therefrom. The parts are removably held in position through the medium of a winged nut 18 which threadedly engages about the base of the penetrating point 16 so as to clamp the members 11 between this end and the shoulder formed by the upper face of the nut 17.

The upper end of the standard 14 is provided with means for engagement around a tree trunk, while the penetrating point 16 is adapted to enter the base or butt of the trunk. The means just referred to comprises a pair of curved gripping jaws 19 having one of their ends formed with apertured ears 20. These ears are disposed in superimposed relation upon the upper end of the standard 14 and rest upon a shoulder formed by a nut or other member 21. The jaws 19 are thus pivotally secured together upon the standard and are held against accidental pivotal movement through the medium of a winged nut 22 which is threaded upon the standard.

From the foregoing description and the accompanying drawings, it will be seen that the invention provides a cheap, simple and light holder for Christmas trees and the like which may be easily and quickly set up for use, the pin 16 engaging the base or butt of the tree trunk while the gripping jaws 19 are adjusted to conform to the diameter of the trunk. The construction of the device is such that it may be cheaply made from standard materials and is arranged so that its parts may be easily separated and stored in any convenient place when not in use.

The invention is susceptible of various changes in its form, proportions and minor details of construction and the right is herein reserved to make such changes as properly fall within the scope of the appended claim.

Having described the invention what is claimed is:—

A tree holder of the class described comprising a base, a standard having its lower end bent to provide a U-shaped hook, said lower end of hook being pointed and passed through an opening formed in said base, a thumbscrew threaded to the pointed end portion of said hook and engaging said base to hold the standard to the base, curved jaws arranged end to end and having their meeting ends overlapping and formed with openings to receive the upper end of said standard, a thumbscrew threaded onto the upper end of the standard to hold the jaws in place thereon, the inner surfaces of said jaws being formed with teeth to engage the trunk of the tree.

In testimony whereof I affix my signature.

JOHN ULLRICH.